Aug. 17, 1926.
A. W. HAASE
1,596,830
CORN HUSKING MACHINE
Filed Oct. 18, 1922     5 Sheets-Sheet 3
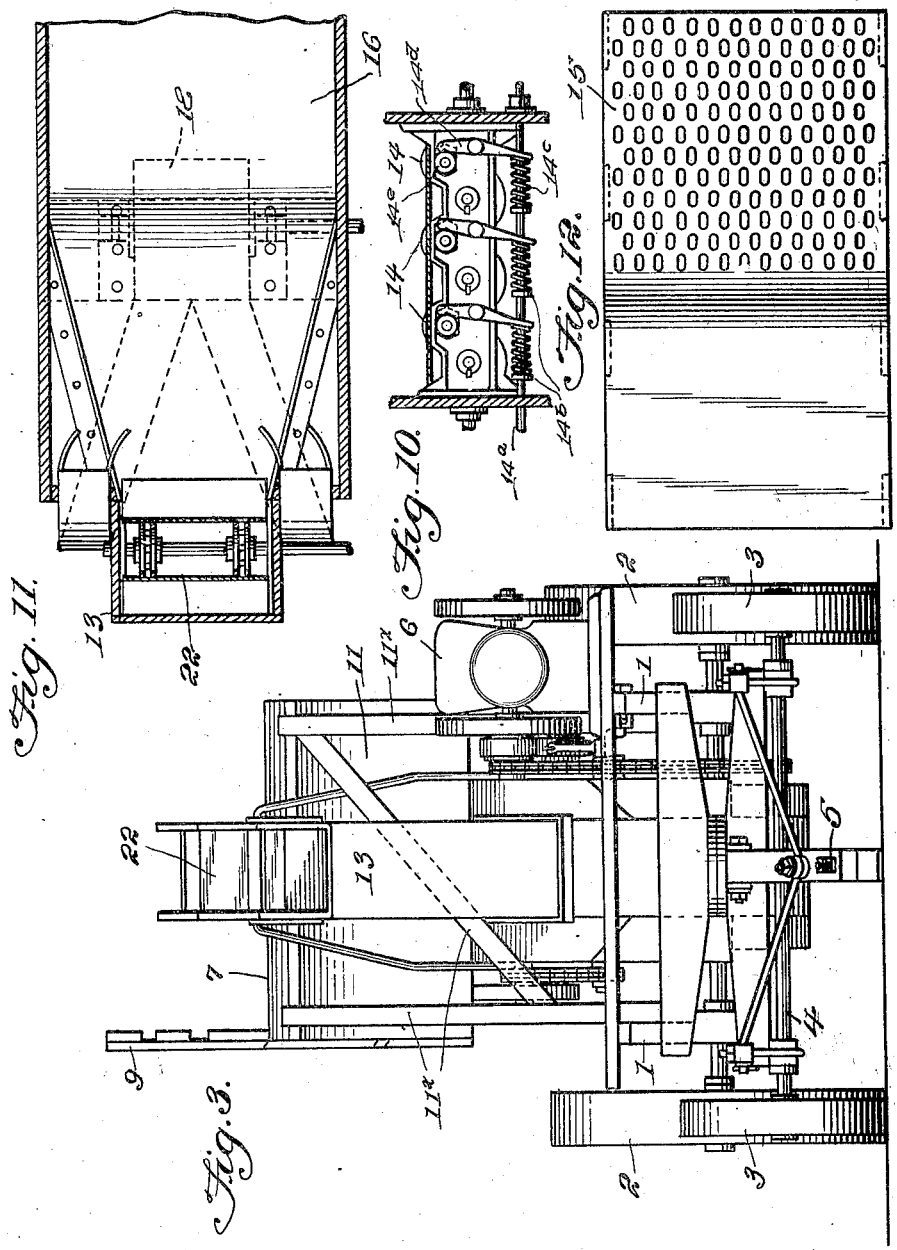
August W. Haase
INVENTOR
BY Victor J. Evans
ATTORNEY

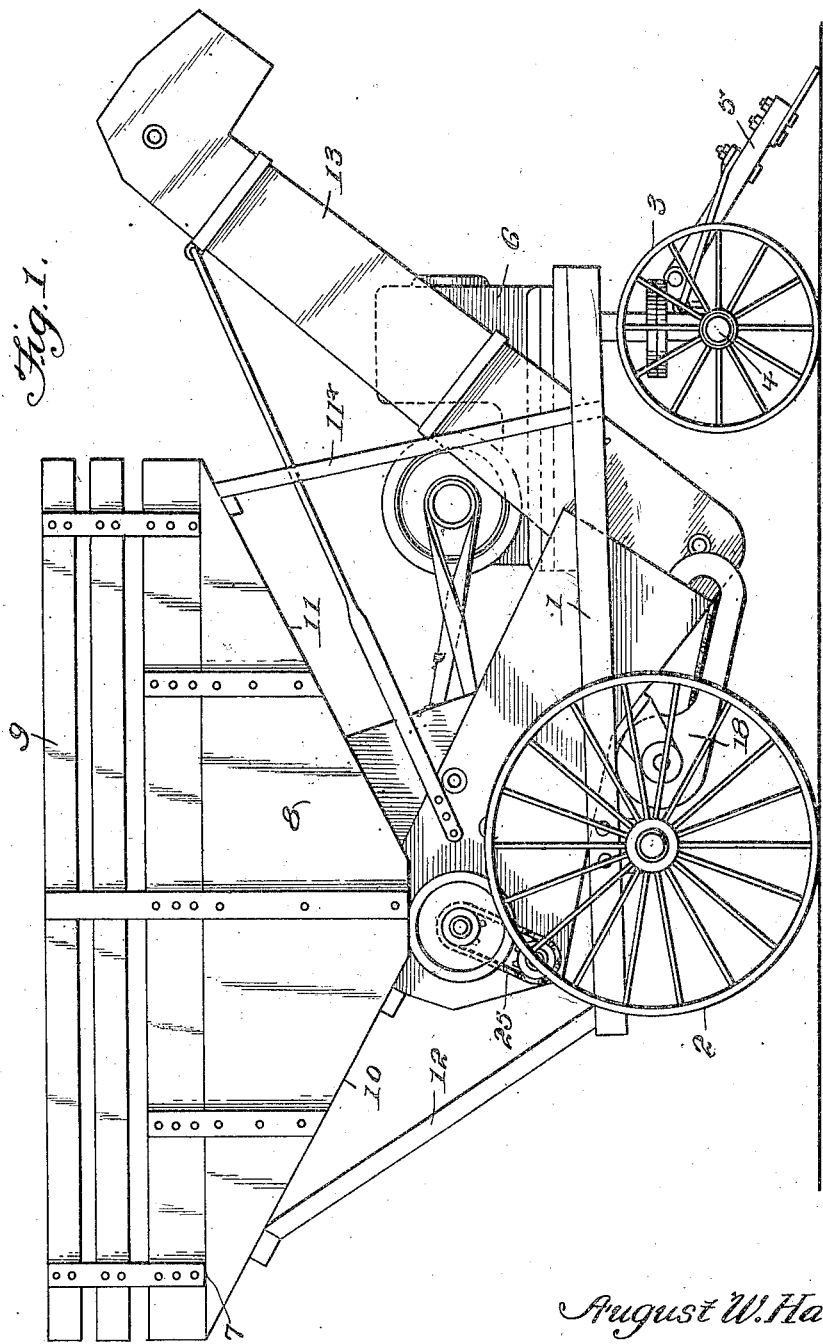

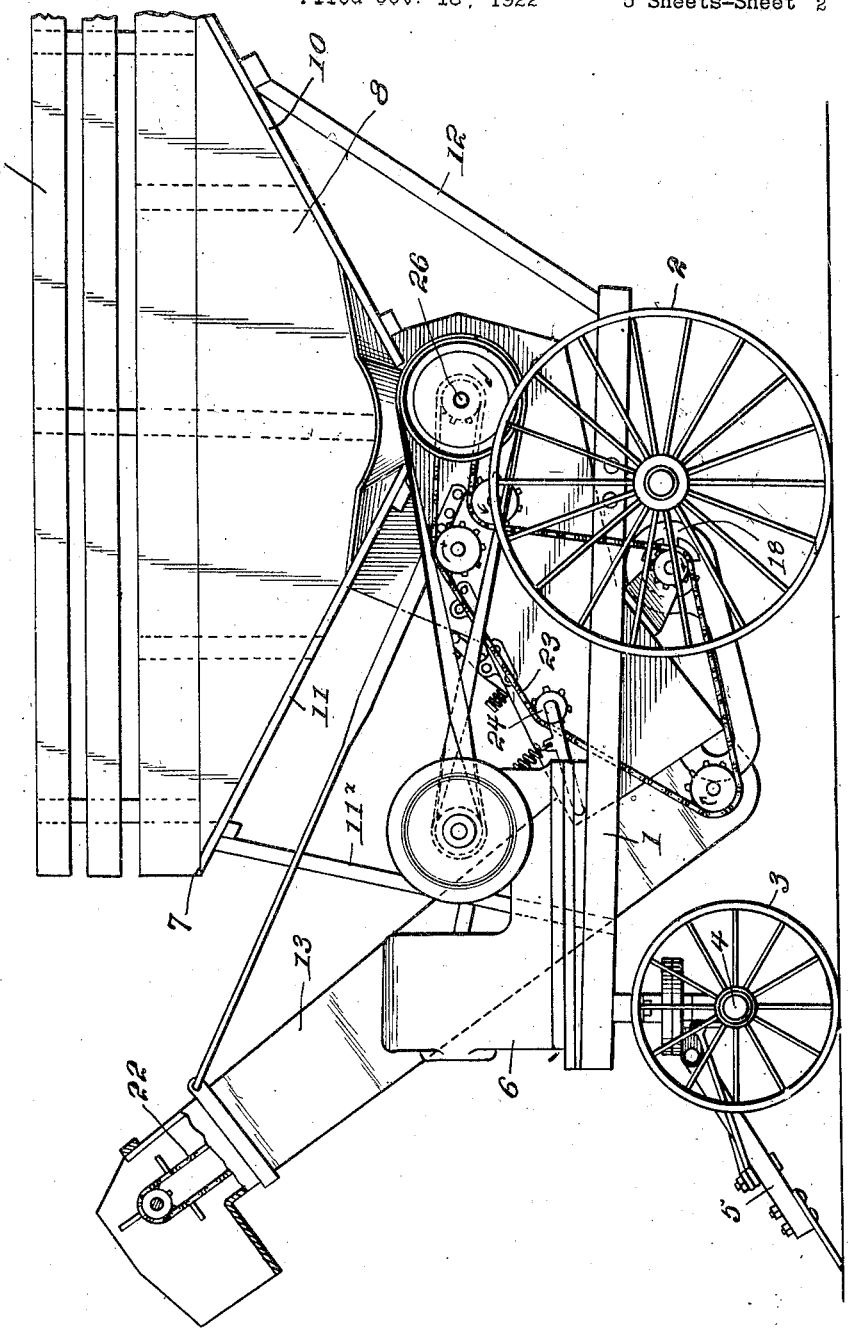

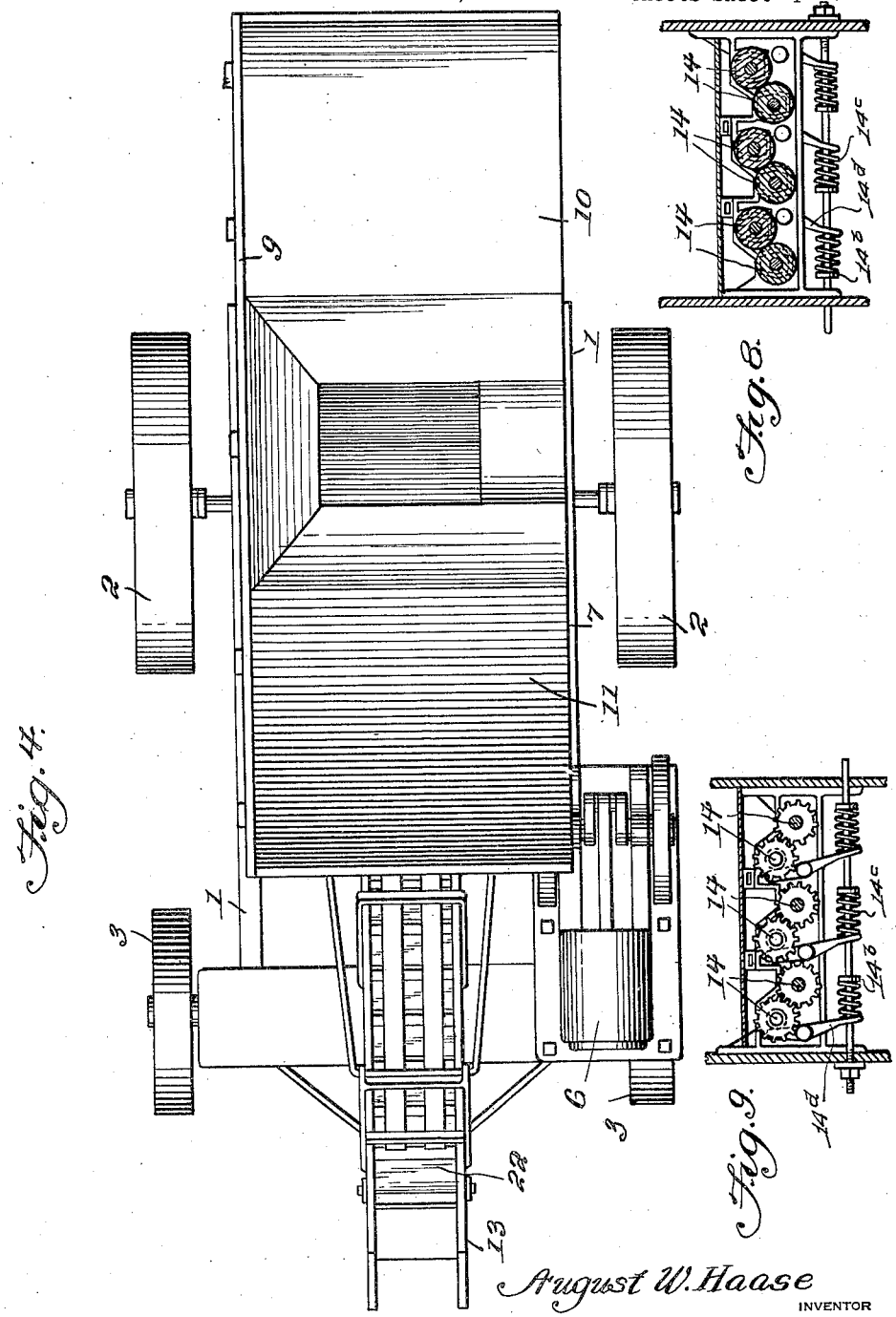

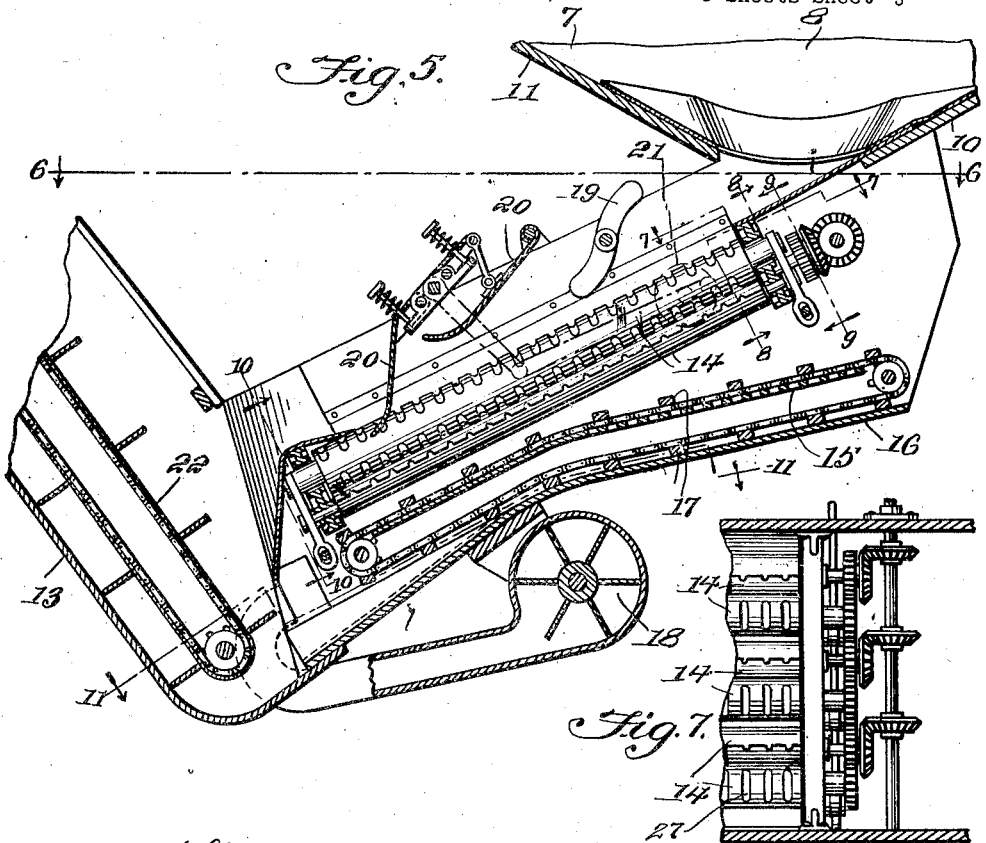
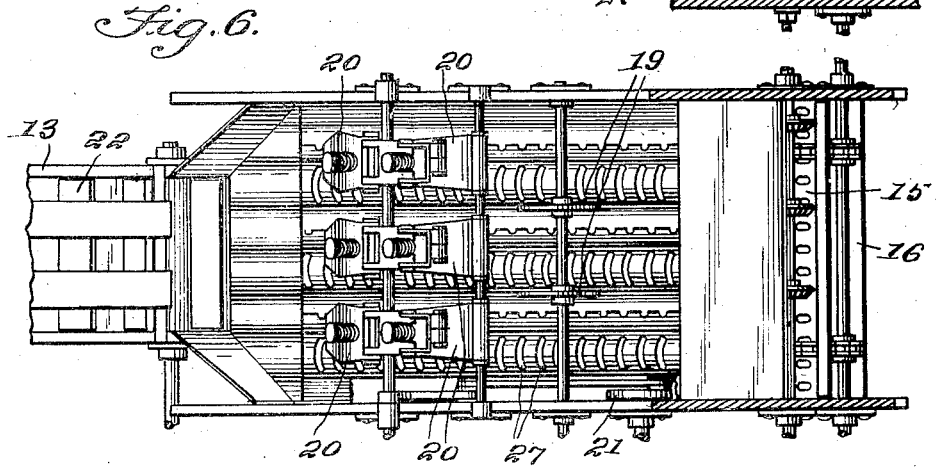

Patented Aug. 17, 1926.

1,596,830

UNITED STATES PATENT OFFICE.

AUGUST W. HAASE, OF FENTON, IOWA.

CORN-HUSKING MACHINE.

Application filed October 18, 1922. Serial No. 595,302.

The object of my said invention is the provision of a corn husking machine characterized by simplicity in construction and capacity in operation.

To the attainment of the foregoing, the invention consists in the improvement as hereinafter described and definitely claimed.

In the accompanying drawings, forming part of this specification:—

Figure 1 is an elevation showing the right hand side of my novel corn husking machine which has been reduced to actual practice and successfully operated to a limited extent.

Figure 2 is an elevation showing the left hand side of the machine.

Figure 3 is a front end elevation of the machine.

Figure 4 is a top plan view of the machine.

Figure 5 is an enlarged vertical longitudinal section showing the working parts of the machine.

Figure 6 is a horizontal section taken in the plane indicated by the line 6—6 of Figure 5.

Figure 7 is a detail section taken on the line 7—7 of Figure 5, looking downwardly and showing the driving connections for the husking rollers.

Figure 8 is a transverse section taken on the line 8—8 of Figure 5.

Figure 9 is a transverse section taken in the plane indicated by the line 9—9 of Figure 5.

Figure 10 is a transverse section taken in the plane indicated by the line 10—10 of Figure 9.

Figure 11 is a detail section taken on the line 11—11 of Figure 5.

Figure 12 is a plan view of the sieve comprised in the machine.

Similar numerals of reference designate corresponding parts in all of the views of the drawings.

In the illustrated specific embodiment of my invention I employ a frame 1 supported by rear wheels 2 and front wheels 3, the latter being carried by an axle 4 pivotally connected with the frame 1 and equipped with a stub-tongue 5, designed to be hitched in appropriate manner at the back of a wagon.

The working parts of my novel husking machine are actuated in the manner hereinafter described from an internal combustion engine 6 superimposed upon and carried by the frame 1 at a point adjacent to the left hand side and forward end thereof.

Among other elements the machine comprises a hopper 7 open at the left hand side of the machine and closed as indicated by 8 at the right hand side of the machine, and provided on the closure side wall with an upwardly extending guard or fender 9. As clearly shown in the drawings the hopper 7 is formed by two walls 10 and 11 which are inclined longitudinally and converge downwardly to a point above and appropriately spaced from the frame 1. The rear hopper wall 10 is supported at its rear end by the rear portion of the frame 1 through the medium of inclined struts 12. The front hopper wall 11 is supported by struts 11$^x$.

In addition to the hopper 7, the machine includes an elevator 13 which extends upwardly and forwardly from its lower end and overhangs the forward portion of the frame 1 and the rear portion of the body of the wagon before alluded to into which the elevator is designed to discharge husked corn.

As best shown in Figures 5 to 8 the machine also comprises husking rollers 14, a sieve 15, a corn pan 16, a rake 17, having transverse strips carried thereby, a fan 18, blades 19 to straighten the corn relatively to the rollers 14, and oscillating members 20 for holding the corn to the rollers 14, the said members 20 being actuated by eccentrics 21. These several elements are relatively arranged as shown in Figures 5 to 11, and by reference to the said figures and the other figures in the drawings it will be understood that the corn thrown into the hopper 7 at one side thereof passes downwardly over the husking rollers 14, and passes from the ends of the said rollers into the endless conveyor 22 of the elevator 13 to be raised and delivered to the wagon body in the manner before described. The husks removed from the ears of corn pass downwardly between the rollers and to the sieve 15. The rake 17 operates above the sieve to discharge the husks at the rear thereof. The shelled corn passes downwardly through the sieve 15 to the corn pan 16, and is delivered ultimately to the lower part of the elevator 13 to be taken up by the conveyor 22.

The fan 18, relatively arranged as illustrated, is designed and adapted to force air between the sieve 15 and the corn pan 16 so as to discharge dirt and particles of husks rearwardly from the machine. The straightening blades 19 are driven through the medium of a sproket belt 23, Figure 2, appropriately connected as illustrated with the engine 6. The same belt 23 actuates the eccentrics 21, the conveyor 22 and the fan 18. It will be noticed that the belt 23 is engaged with a sprocket gear 24 for holding said belt taut. The rake 17 is driven by a sprocket belt 25 connected with the opposite end of the shaft that is designated by 26, Figures 1 and 2.

The husking rollers 14 are provided in opposite sides with grooves 27, the grooves in one side of each roller 14 being preferably arranged in alinement with the spaces between the grooves in the opposite side of the roller, Figure 5; husking rollers 14 are arranged in pairs, Figures 8 and 9, and one roller of each pair is arranged lower than the other and at one side of the vertical plane of such other. The upper of the husking rollers 14 are movable laterally toward and from the lower husking rollers 14, and at the opposite ends of the husking rollers means are provided for yieldingly pressing the upper rollers against the lower rollers. The said means at each end of the collection of the rollers 14 comprises a transverse shaft 14$^a$ appropriately held against endwise movement and provided with abutments 14$^b$, coiled springs 14$^c$ mounted on the said shaft and bearing against said abutments, and levers 14$^d$ fulcrumed at intermediate points of their length and having their lower arms subject to the section of the said springs 14$^c$ and their upper arms arranged to press against anti-friction rollers 14$^e$ on the shafts of the upper husking rollers 14 so as to bring about the holding of the upper rollers 14 under yielding pressure against the lower husking rollers.

Manifestly by virtue of this construction the capacity of the mechanism in husking corn is increased, and at the same time the liability of choking or breakage is reduced to a minimum.

My novel machine will be appreciated as advantageous when it is stated that after snapping corn, the farm hand working on the ground alongside the machine can conveniently throw the corn into the hopper 7 through the opening at one side of the hopper and above the plane of the organized mechanism, when the corn will take the course hereinbefore described and will be acted on in the manner and for the purpose set forth.

It will further be appreciated that the practical use of my novel machine does not entail breaking down of the corn stalks in a field.

Having described my invention, what I claim and desire to secure by Letters Patent, is:—

In a corn husking mechanism, an inclined sieve arranged below the husking means thereof, a downwardly inclined corn pan arranged below the sieve and in spaced relation thereto, endless raking means having its upper stretch arranged above the sieve and engaging the same and also following the shape thereof, and its lower stretch disposed above a portion of the corn pan, transverse strips carried by said raking means, an endless elevator arranged to receive husked corn from the lower portion of the corn pan and the endless raking means respectively, and the upper stretch of said raking means being adapted to rake the husks of the corn away and the lower stretch of said raking means being adapted to rake shelled corn from the corn pan to be received by the endless elevator.

In testimony whereof I affix my signature.

AUGUST W. HAASE.